US007421506B2

(12) United States Patent
Ni et al.

(10) Patent No.: US 7,421,506 B2
(45) Date of Patent: Sep. 2, 2008

(54) LOAD BALANCER FOR MULTIPROCESSOR PLATFORMS

(75) Inventors: Shaoji Ni, Espoo (FI); Timo Jokiaho, Vantaa (FI); Mika Panhelainen, Joensuu (FI); Mikael Latvala, Helsinki (FI); Vesa-Pekka Takala, Klaukkala (FI)

(73) Assignee: Nokia Corporation, Espoo (FI)

( * ) Notice: Subject to any disclaimer, the term of this patent is extended or adjusted under 35 U.S.C. 154(b) by 703 days.

(21) Appl. No.: 11/008,656

(22) Filed: Dec. 10, 2004

(65) Prior Publication Data

US 2005/0120350 A1    Jun. 2, 2005

Related U.S. Application Data

(63) Continuation of application No. PCT/FI03/00338, filed on Apr. 29, 2003.

(30) Foreign Application Priority Data

Jun. 12, 2002    (FI) .................................. 20021137

(51) Int. Cl.
*G06F 15/16*    (2006.01)
*H04L 12/28*    (2006.01)
*H04J 3/24*    (2006.01)
(52) U.S. Cl. ........................ 709/230; 370/474; 370/392
(58) Field of Classification Search ................ 709/230, 709/249; 370/474, 392
See application file for complete search history.

(56) References Cited

U.S. PATENT DOCUMENTS 7,292,575 B2 * 11/2007 Lemieux et al. ............. 370/392
2006/0050667 A1 * 3/2006 Verma et al. ................ 370/338

FOREIGN PATENT DOCUMENTS

EP    1 091 602 A2    4/2001
EP    1091602 A2 *    4/2001

OTHER PUBLICATIONS

GPRS Tunneling Protocol accross the Gn and Gp Interface, 1999 pp. 49-50, 68-70, 76-77.*
3GPP TS 29.060 V3.12.0 (Mar. 2002). Technical Specification. 3rd Generation Partnership Project; Technical Specification Group Core Network; General Packet Radio Service (GPRS); GPRS Tunnelling Protocol (GTP) across the Gn and Gp Interface (Release 1999).

* cited by examiner

*Primary Examiner*—Larry D Donaghue
(74) *Attorney, Agent, or Firm*—Squire, Sanders & Dempsey L.L.P.

(57) ABSTRACT

The present invention concerns load balancing for control plane traffic of a network element comprising multiple CPU nodes assigned to a common external IP address in a packet data enabled telecommunication network. IP messages addressed to the network element are received, and received IP messages comprising GTP-C messages are identified. A TEID-C value of a GTP-C message is identified and the GTP-C message is forwarded to a CPU node based on its identified TEID-C value, if its identified TEID-C value does not equal zero.

25 Claims, 3 Drawing Sheets

LOAD BALANCER FOR MULTIPROCESSOR PLATFORMS

This is a Continuation of International Application No. PCT/FI03/00338 filed Apr. 29, 2003, which designated the U.S. and was published under PCT Article 21(2) in English.

FIELD OF THE INVENTION

The present invention relates to telecommunications. In particular, the present invention relates to a novel and improved method and system for load balancing for control plane traffic of a network element comprising multiple CPU (central processing unit) nodes assigned to a common external IP address in a packet data enabled telecommunication network.

BACKGROUND OF THE INVENTION

Recently telecommunication networks, e.g. mobile communication networks have started to adopt Internet Protocol (IP) based implementations. A typical network element comprises multiple application CPU nodes. Typically one external IP address is used for these CPU nodes, thus resulting in flexible scaling capacity expansion, easy balancing of computing power of each CPU node, and less manual configuration of applications.

However, since one external IP address is used for all the application CPU nodes, the functionality of a load balancer needs to be implemented. Because the topology and internal IP addresses of the CPU nodes are hidden from outside, a load balancer is needed to direct control plane traffic, such as signaling, to the nodes for processing.

Since load balancing is directly dependent on protocols and interfaces involved, and since protocols and interfaces vary depending on network element involved, load balancing typically needs to be implemented on a network element specific basis for it be effective.

General Packet Radio Service (GPRS) is a packet data service designed to support especially digital mobile networks based on the GSM (Global System, for Mobile Communications) standard, UMTS (Universal Mobile Telecommunications System) or GERAN (GSM EDGE Radio Access Network) systems, as well as American Time Division Multiple Access (TDMA) system, the IS-136. Additionally, GPRS may also be connected to an IP Multimedia Subsystem (IMS).

A GPRS enabled mobile communication network comprises a Serving GPRS Support Node (SGSN) and a Gateway GPRS Support Node (GGSN). An SGSN typically delivers packets to GPRS enabled mobile stations (MS) within its service area. A GGSN is typically used as an interface to external IP networks such as the Internet, other mobile service providers' GPRS services, or enterprise intranets. A GGSN may maintain routing information necessary to tunnel the protocol data units (PDU) to the SGSN that services a particular MS.

FIG. 1 discloses an example of a prior art GPRS enabled communication network. The network comprises a Circuit Switched Core Network (CS CN) domain and a Packet Switched Core Network (PS CN) domain. The Packet Switched Core Network domain further comprises an SGSN and a GGSN. A Home Subscriber Server (HSS) connects the SGSN and the Circuit Switched Core Network to each other. The network further comprises IP Multimedia Subsystems connected to the GGSN and the Home Subscriber Server. The network further comprises Radio Access Networks (RAN) connected to the Circuit Switched Core Network and the Packet Switched Core Network.

A GGSN utilizes several interfaces with several protocols. Thus several types of traffic may arrive to a GGSN simultaneously. Typically the traffic associated with a GGSN needs to be delivered to a specific subscriber or to a session on a specific signaling node.

Thus load balancing for a GGSN comprising multiple CPU nodes assigned to a common external IP address needs to address several issues. The load of each application CPU node needs to be balanced. Further, the response message from a source network element needs to be forwarded to a destination application CPU node that previously sent a signaling request to the source network element. Further, a series of sequential signaling messages for information updating and maintaining sent by other network elements to a specific subscriber or session needs to be forwarded to the destination application CPU node serving the particular subscriber or session.

Thus there is need for a solution solving all these issues. Prior art load balancers may solve some of these issues. However, there is no available method providing a solution for all the issues mentioned for a GGSN comprising multiple CPU nodes assigned to a common external IP address.

SUMMARY OF THE INVENTION

The present invention concerns load balancing for control plane traffic of a network element comprising multiple CPU nodes assigned to a common external IP address in a packet data enabled telecommunication network. IP messages addressed to the network element are received, and received IP messages comprising GTP-C (GPRS Tunneling Protocol-Control plane) messages are identified. First, a destination IP address value of a received IP message is identified, and it is determined from the identified destination IP address value whether the IP message belongs to control plane traffic or user plane traffic. Next a protocol value of an IP message belonging to control plane traffic is identified, and it is determined from the identified protocol value whether the IP message comprises an UDP (User Datagram Protocol) message or a TCP (Transmission Control Protocol) message.

A destination port number value of an IP message comprising a TCP message is identified, and the TCP message is forwarded to a CPU node based on its identified destination port number value. A destination port number value of an IP message comprising a UDP message is identified, and it is determined from the identified destination port number value whether the UDP message further comprises a GTP-C message, a GTP' (GTP Prime) message, a DHCP (Dynamic Host Configuration Protocol) message or a RADIUS (Remote Authentication Dial In User Service) message. A GTP' message, a DHCP message or a RADIUS message is forwarded to a CPU node based on its identified destination port number value.

According to the invention a TEID-C (Tunnel Endpoint Identifier for Control Plane) value of a GTP-C message is identified. The GTP-C message is forwarded to a CPU node based on its identified TEID-C value, if its identified TEID-C value does not equal zero. However, if the identified TEID-C value of the GTP-C message equals zero, a message type value of the GTP-C message is further identified. The GTP-C message is forwarded to a CPU node by using a predetermined load balancing procedure, if its identified message type value equals "Create PDP Context". Said predetermined load balancing procedure may be based on e.g. hash function or round robin method. If the identified message type value of the GTP-C message does not equal "Create PDP Context", the GTP-C message is forwarded to a CPU node by-using a predetermined path and error management procedure. The aforementioned PDP refers to Packet Data Protocol.

In an embodiment of the invention the packet data enabled telecommunication network is a GPRS enabled communication network, e.g. a 3GPP system (3$^{rd}$ Generation Partnership Project). A 3GPP system comprises user equipment, a radio access network and a core network. The radio access network may be UTRAN (Universal Terrestrial Radio Access Network) and/or GERAN. The core network may comprise a circuit-switched domain, a packet-switched domain and/or an IP multimedia subsystem.

In an embodiment of the invention the network element is a GGSN element.

The present invention provides a solution for several issues regarding load balancing for a GGSN comprising multiple CPU nodes assigned to a common external IP address. The present invention makes it possible to balance the load of each application CPU node. Further, the present invention makes it possible to forward the response message from a source network element to a destination application CPU node that previously sent a signaling request to the source network element. Further, the present invention makes it possible to forward a series of sequential signaling messages for information updating and maintaining sent by other network elements to a specific subscriber or session to the destination application CPU node serving the particular subscriber or session.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

Figure 1:
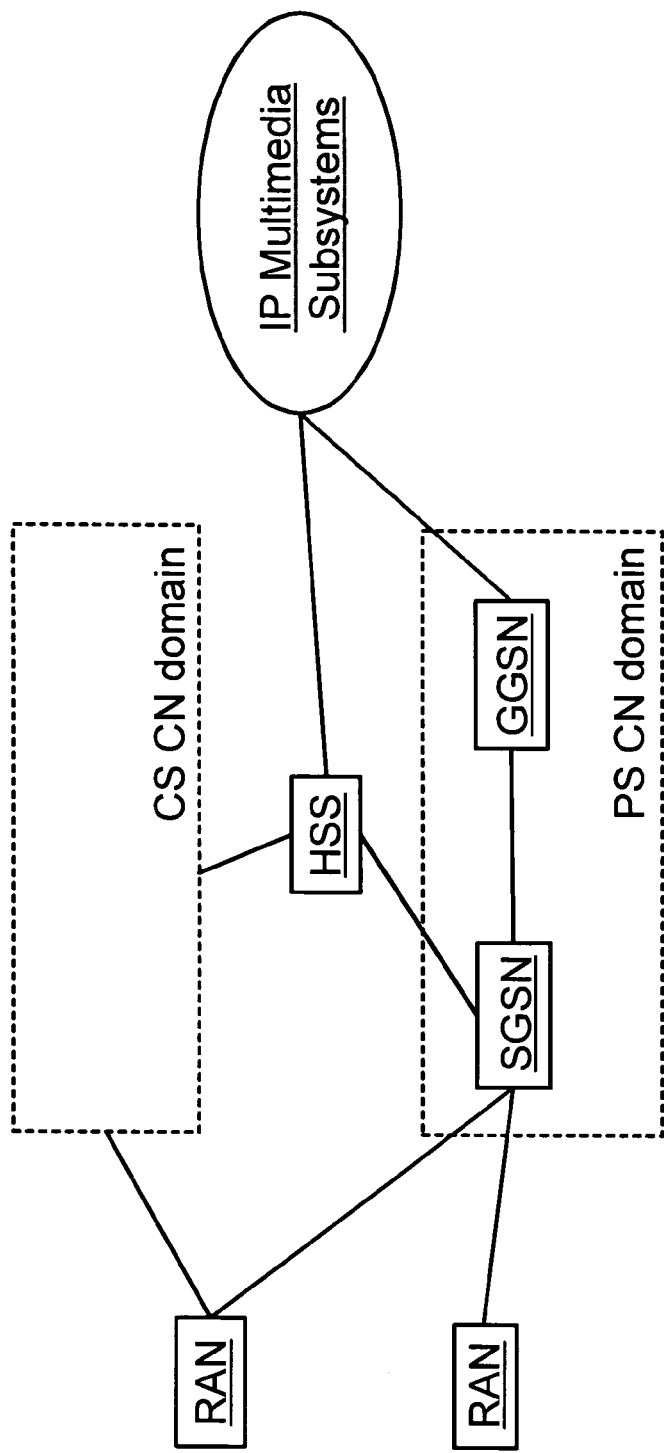
FIG. 1 is a block diagram illustrating a prior art GPRS enabled communication network.
Figure 2:
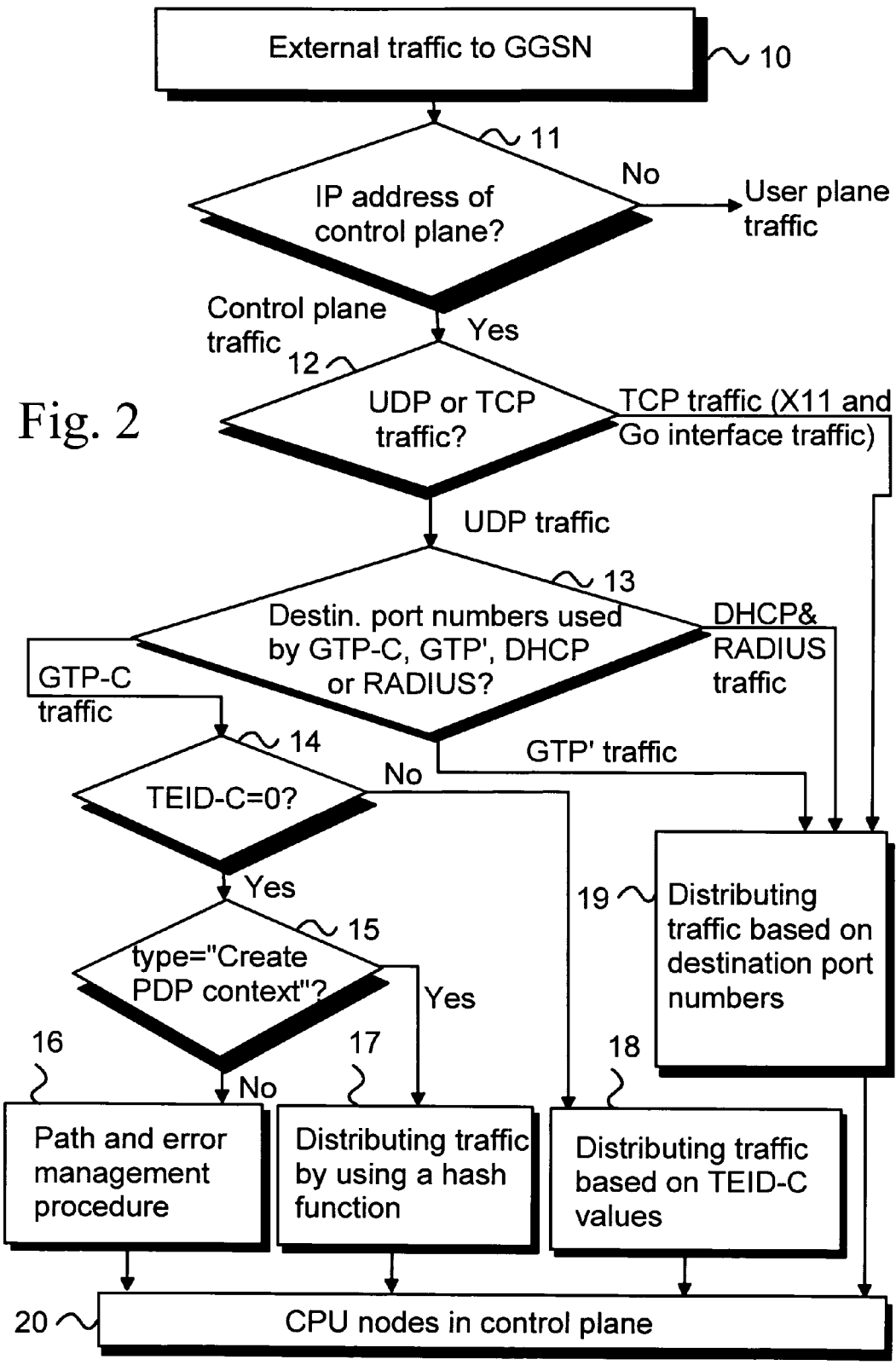
FIG. 2 is a flow chart illustrating a load balancing method according to one embodiment of the present invention.

FIG. 2 illustrates a load balancing method for control plane traffic of a GGSN network element comprising multiple CPU nodes assigned to a common external IP address in a GPRS enabled telecommunication network, e.g. a 3GPP system. IP messages addressed to the network element are received, phase 10. Received IP messages comprising GTP-C messages are identified. First, a destination IP address value of a received IP message is identified, and it is determined from the identified destination IP address value whether the IP message belongs to control plane traffic or user plane traffic, phase 11. Next a protocol value of an IP message belonging to control plane traffic is identified, and it is determined from the identified protocol value whether the IP message comprises an UDP message or a TCP message, phase 12.

If the message is a TCP message, its destination port number value is identified, and the TCP message is forwarded to a CPU node based on its identified destination port number value, phase 19. If the message is a UDP message, its destination port number value is identified, and it is determined from the identified destination port number value whether the UDP message further comprises a GTP-C message, a GTP' message, a DHCP message or a RADIUS message, phase 13. A GTP' message, a DHCP message or a RADIUS message is forwarded to a CPU node based on its identified destination port number value, phase 19.

If the message is a GTP-C message, its TEID-C value is identified, phase 14. In phase 18 the GTP-C message is forwarded to a CPU node based on its identified TEID-C value, if its identified TEID-C value does not equal zero. However, if the identified TEID-C value of the GTP-C message equals zero, a message type value of the GTP-C message is further identified, phase 15. The GTP-C message is forwarded to a CPU node by using a predetermined load balancing procedure, if its identified message type value equals "Create PDP Context", phase 17. If the identified message type value of the GTP-C message does not equal "Create PDP Context", the GTP-C message is forwarded to a CPU node by using a predetermined path and error management procedure, phase 16.

Figure 3:
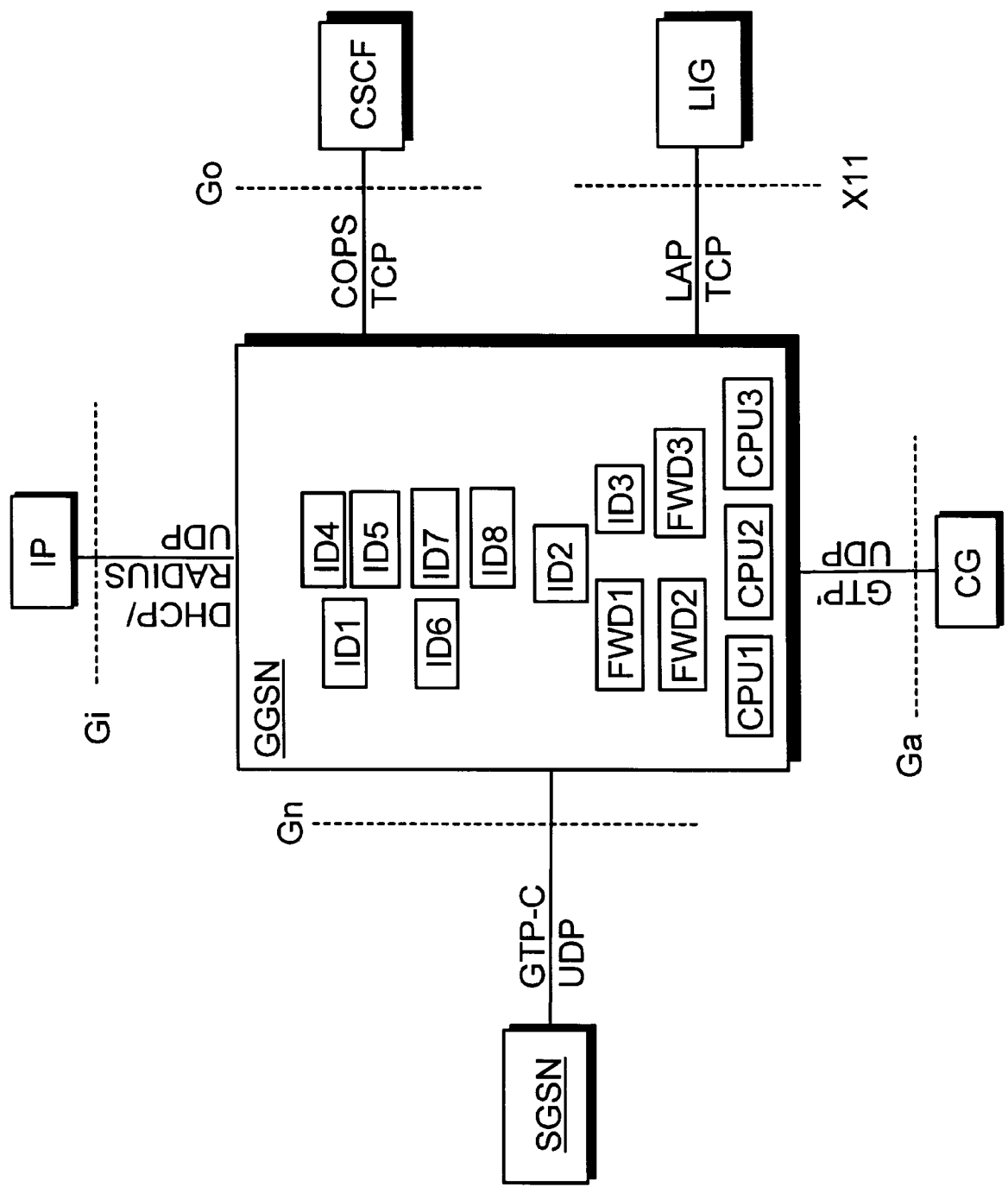
FIG. 3 is a block diagram illustrating a load balancing system according to one embodiment of the present invention.

FIG. 3 illustrates a load balancing system for control plane traffic of a GGSN network element comprising multiple CPU nodes assigned to a common external IP address in a GPRS enabled telecommunication network, e.g. a 3GPP system. In the embodiment of the invention disclosed in FIG. 3 the telecommunication network comprises an SGSN network element SGSN connected to the GGSN network element GGSN through Gn interface using GTP-C protocol on top of UDP protocol. The telecommunication network further comprises a Charging Gateway CG connected to the GGSN network element GGSN through Ga interface using GTP' protocol on top of UDP protocol. The telecommunication network further comprises a LIG (Legal Interception Gateway) connected to the GGSN network element GGSN through X11 interface using a vendor dependent protocol, e.g. LAP protocol (Lawful-interception Application Protocol) on top of TCP protocol. The telecommunication network further comprises a CSCF (Call State Control Function, sometimes also referred to as Call Server Control Function; typically used for executing call control functions, service switching functions, address translation functions and vocoder negotiation functions) connected to the GGSN network element GGSN through Go interface using COPS (Common Open Policy Service) protocol on top of TCP protocol. The telecommunication network further comprises an external IP network IP connected to the GGSN network element GGSN through Gi interface using DHCP and/or RADIUS protocol on top of UDP protocol. Thus FIG. 3 serves to illustrate how the GGSN utilizes several interfaces with several protocols. Several types of traffic may arrive to the GGSN simultaneously. Typically the traffic associated with the GGSN needs to delivered to a specific subscriber or to a session on a specific signaling node.

In the embodiment of the invention disclosed in FIG. 3 the GGSN network element GGSN comprises CPU nodes CPU$_1$, CPU$_2$ and CPU$_3$ assigned to a common external IP address for receiving IP messages. The system further comprises first identifying means ID1 for identifying received IP messages comprising GTP-C messages, second identifying means ID2 for identifying a TEID-C value of a GTP-C message, first forwarding means FWD1 for forwarding a GTP-C message with a TEID-C value non-equal to zero to a CPU node based on the TEID-C value, third identifying means ID3 for further identifying a message type value of a GTP-C message with a TEID-C value equaling zero, second forwarding means FWD2 for forwarding a GTP-C message with a message type value equaling "Create PDP Context" to a CPU node by using a predetermined load balancing procedure, and third forwarding means FWD3 for forwarding a GTP-C message with a message type value non-equal to "Create PDP Context" to a CPU node by using a predetermined path and error management procedure.

The system illustrated in FIG. 3 further comprises fourth identifying means ID4 for identifying a destination IP address value of a received IP message and determining from the identified destination IP address value whether the IP message belongs to control plane traffic or user plane traffic, fifth identifying means ID5 for identifying a protocol value of an IP message belonging to control plane traffic and determining from the identified protocol value whether the IP message comprises an UDP message or a TCP message, and sixth identifying means ID6 for identifying a destination port number value of an IP message comprising a TCP message and forwarding the TCP message to a CPU node based on its identified destination port number value.

The system illustrated in FIG. 3 further comprises seventh identifying means ID7 for identifying a destination port number value of an IP message comprising a UDP message and determining from the identified destination port number value whether the UDP message further comprises a GTP-C message, a GTP' message, a DHCP message or a RADIUS message, and eighth identifying means ID8 for forwarding a GTP' message, a DHCP message or a RADIUS message to a CPU node based on its identified destination port number value.

It is obvious to a person skilled in the art that with the advancement of technology, the basic idea of the invention may be implemented in various ways. The invention and its embodiments are thus not limited to the examples described above, instead they may vary within the scope of the claims.

The invention claimed is:

1. A method, comprising:
receiving internet protocol messages addressed to a network element in a packet data enabled telecommunication network, the network element comprising multiple central processing units assigned to a common external internet protocol address;
identifying received internet protocol messages comprising general packet radio service tunneling protocol messages;
identifying a tunnel endpoint identifier-control value of the general packet radio service tunneling protocol message;
depending on the identified tunnel endpoint identifier-control value of the general packet radio service tunneling protocol message either forwarding said general packet radio service tunneling protocol message to a central processing unit based on the identified tunnel endpoint identifier-control value of said general packet radio service tunneling protocol-control message or identifying a message type value of said general packet radio service tunneling protocol-control message; and
forwarding a general packet radio service tunneling protocol-control message with an identified message type value equal to "Create PDP Context" to a central processing unit by using a predetermined load balancing procedure.

2. The method according to claim 1, wherein said forwarding the general packet radio service tunneling protocol-control message to a central processing unit based on the identified tunnel endpoint identifier-control value of said general packet radio service tunneling protocol-control message is performed if the identified tunnel endpoint identifier-control value does not equal zero, and said identifying the message type value of the general packet radio service tunneling protocol-control message is performed if the identified tunnel endpoint identifier-control value equals zero.

3. The method according to claim 1, further comprising:
forwarding a general packet radio service tunneling protocol-control message with an identified message type value non-equal to "Create PDP Context" to a central processing unit by using a predetermined path and error management procedure.

4. The method according to claim 1, wherein the identifying received internet protocol messages comprising general packet radio service tunneling protocol-control messages further comprises:
identifying a destination internet protocol address value of a received internet protocol message; and
determining from the identified destination internet protocol address value whether the internet protocol message belongs to control plane traffic or user plane traffic.

5. The method according to claim 4, further comprising:
identifying a protocol value of an internet protocol message belonging to control plane traffic; and
determining from the identified protocol value whether the internet protocol message comprises an user datagram protocol message or a transmission control protocol message.

6. The method according to claim 5, further comprising:
identifying a destination port number value of an internet protocol message comprising a transmission control protocol message; and
forwarding the transmission control protocol message to a central processing unit based on its identified destination port number value.

7. The method according to claim 5, comprising:
identifying a destination port number value of an internet protocol message comprising a user datagram protocol message; and
determining from the identified destination port number value whether the user datagram protocol message further comprises a general packet radio service tunneling protocol-control message, a general packet radio service tunneling protocol prime message, a dynamic host configuration protocol message or a remote authentication dial in user service message.

8. The method according to claim 7, comprising:
forwarding a general packet radio service tunneling protocol prime message, a dynamic host configuration protocol message or a remote authentication dial in user service message to a central processing unit based on its identified destination port number value.

9. The method according to claim 1, wherein the packet data enabled telecommunication network is a general packet radio service enabled communication network.

10. The method according to claim 9, wherein the network element is a gateway general packet radio service support node element.

11. A system, comprising:
a network element in a packet data enabled telecommunication network, comprising multiple central processing units assigned to a common external internet protocol address for receiving internet protocol messages; and
first identifying means for identifying received internet protocol messages comprising general packet radio service tunneling protocol-control messages;
second identifying means for identifying a tunnel endpoint identifier-control value of a general packet radio service tunneling protocol-control message;
first forwarding means for forwarding a general packet radio service tunneling protocol-control message to a central processing unit based on the identified tunnel endpoint identifier-control value of said general packet radio service tunneling protocol-control message;
third identifying means for identifying a message type value of a general packet radio service tunneling protocol-control message; and
second forwarding means for forwarding a general packet radio service tunneling protocol-control message with an identified message type value equal to "Create PDP Context" to a central processing unit by using a predetermined load balancing procedure.

12. The system according to claim 11, wherein said first forwarding means are used if the identified tunnel endpoint identifier-control value does not equal zero, and said third identifying means are used if the identified tunnel endpoint identifier-control value equals zero.

13. The system according to claim 11, further comprising:
third forwarding means for forwarding a general packet radio service tunneling protocol-control message with an identified message type value non-equal to "Create PDP Context" to a central processing unit by using a predetermined path and error management procedure.

14. The system according to claim 11, further comprising:
fourth identifying means for identifying a destination internet protocol address value of a received internet protocol message and determining from the identified destination internet protocol address value whether the internet protocol message belongs to control plane traffic or user plane traffic.

15. The system according to claim 14, further comprising:
fifth identifying means for identifying a protocol value of an internet protocol message belonging to control plane traffic and determining from the identified protocol value whether the internet protocol message comprises an user datagram protocol message or a transmission control protocol message.

16. The system according to claim 15, further comprising:
sixth identifying means for identifying a destination port number value of an internet protocol message comprising a transmission control protocol message and forwarding the transmission control protocol message to a central processing unit based on its identified destination port number value.

17. The system according to claim 15, further comprising:
seventh identifying means for identifying a destination port number value of an internet protocol message comprising a user datagram protocol message and determining from the identified destination port number value whether the user datagram protocol message further comprises a general packet radio service tunneling protocol-control message, a general packet radio service tunneling protocol prime message, a dynamic host configuration protocol message or a remote authentication dial in user service message.

18. The system according to claim 17, further comprising:
eighth identifying means for forwarding a general packet radio service tunneling protocol prime message, a dynamic host configuration protocol message or a remote authentication dial in user service message to a central processing unit based on its identified destination port number value.

19. The system according to claim 11, wherein the packet data enabled telecommunication network is a general packet radio service enabled communication network.

20. The system according to claim 19, wherein the network element is a gateway general packet radio service support node element.

21. An apparatus, comprising:
a first identifier configured to identify received internet protocol messages comprising general packet radio service tunneling protocol-control messages and addressed to a network element in a packet data enabled telecommunication network, the network element comprising multiple central processing units assigned to a common external internet protocol address;
a second identifier configured to identify a tunnel endpoint identifier-control value of a general packet radio service tunneling protocol-control message;
a first sender configured to forward the general packet radio service tunneling protocol-control message to a central processing unit based on the identified tunnel endpoint identifier-control value of said general packet radio service tunneling protocol-control message;
a third identifier configured to identify a message type value of a general packet radio service tunneling protocol-control message; and
a second sender configured to forward a general packet radio service tunneling protocol-control message with an identified message type value equal to "Create PDP Context" to a central processing unit by using a predetermined load balancing procedure.

22. The apparatus according to claim 21, wherein said first sender is used if the identified tunnel endpoint identifier-control value does not equal zero, and said third identifier is used if the identified tunnel endpoint identifier-control value equals zero.

23. The apparatus according to claim 21, further comprising:
a third sender configured to forward a general packet radio service tunneling protocol-control message with an identified message type value non-equal to "Create PDP Context" to a central processing unit by using a predetermined path and error management procedure.

24. The apparatus according to claim 21, wherein the apparatus is arranged in a gateway general packet radio service support node element of a general packet radio service enabled telecommunication network.

25. An apparatus, comprising:
first identifying means for identifying received internet protocol messages comprising general packet radio service tunneling protocol-control messages and addressed to a network element in a packet data enabled telecommunication network, the network element comprising multiple central processing units assigned to a common external internet protocol address;
second identifying means for identifying a tunnel endpoint identifier-control value of a general packet radio service tunneling protocol-control message;
first forwarding means for forwarding the general packet radio service tunneling protocol-control message to a central processing unit based on the identified tunnel endpoint identifier-control value of said general packet radio service tunneling protocol-control message;
third identifying means for identifying a message type value of a general packet radio service tunneling protocol-control message; and
second forwarding means for forwarding a general packet radio service tunneling protocol-control message with an identified message type value equal to "Create PDP Context" to a central processing unit by using a predetermined load balancing procedure.

* * * * *